United States Patent [19]

Sherman

[11] Patent Number: 4,805,488
[45] Date of Patent: * Feb. 21, 1989

[54] ADAPTIVE-RATIO TRANSMISSION

[76] Inventor: Albert J. Sherman, 50 Havenwood Dr., Livingston, N.J. 07039

[*] Notice: The portion of the term of this patent subsequent to Apr. 21, 2005 has been disclaimed.

[21] Appl. No.: 842,990

[22] Filed: Mar. 24, 1986

[51] Int. Cl.$^4$ ............................................. F16H 3/74
[52] U.S. Cl. ...................................... 74/752 F; 74/793
[58] Field of Search ................. 74/751, 752 B, 752 F, 74/793, 431, 432, 665 P

[56] References Cited

U.S. PATENT DOCUMENTS

| | | | |
|---|---|---|---|
| 1,741,855 | 12/1929 | Lyman | 74/752 F |
| 1,883,355 | 10/1932 | Edberg | 74/752 F |
| 3,728,911 | 4/1973 | Granville | 74/752 F |
| 4,038,886 | 8/1977 | Wittren | 74/793 |
| 4,191,070 | 3/1980 | McKinniss | 74/793 X |

FOREIGN PATENT DOCUMENTS

| | | | |
|---|---|---|---|
| 2625740 | 12/1977 | Fed. Rep. of Germany | 74/751 |
| 573771 | 6/1924 | France | 74/752 F |
| 427754 | 4/1935 | United Kingdom | 74/751 |
| 898033 | 6/1962 | United Kingdom | 74/752 F |

Primary Examiner—Leslie A. Braun
Assistant Examiner—Dwight G. Diehl

[57] ABSTRACT

An automatically compliant self-adjusting geared transmission mechanism is described that involves no controls of any kind and provides a range of stepless variation in the ratio of its output-torque to its input-torque together with the inversely corresponding variation in output to input rotary-speed ratio. The transmission mechanism comprises coaxial rotatably supported adjacent input and output shafts, each carrying a sun-gear fixedly mounted on its mutually proximate end. The sun-gears mesh with corresponding planetary gears of a planetary gear-spool rotatably mounted on a rotor which is itself freely rotatable about the sun-gears' axis. The proportions of the gear diameters are designed so as to develop a torque in the rotor that balances its torque reaction to the output-torque of the gear-train, while coincidentally providing essential variability to the output to input rotary-speed ratio. Input power automatically divides variably between the planetary gear-spool and the rotor, responsive to rotary-speed of the rotor, to be separately conditioned by their respective mechanical advantages so that when recombined at the output, the resulting output-torque matches the load-torque and the resulting rotary-speed absorbs the power available. The range of output to input ratios provided are increased by coupling together a plurality of the transmission mechanisms, as aligned serially, or by proportioned gears at the inputs and outputs aligned in parallel.

3 Claims, 1 Drawing Sheet

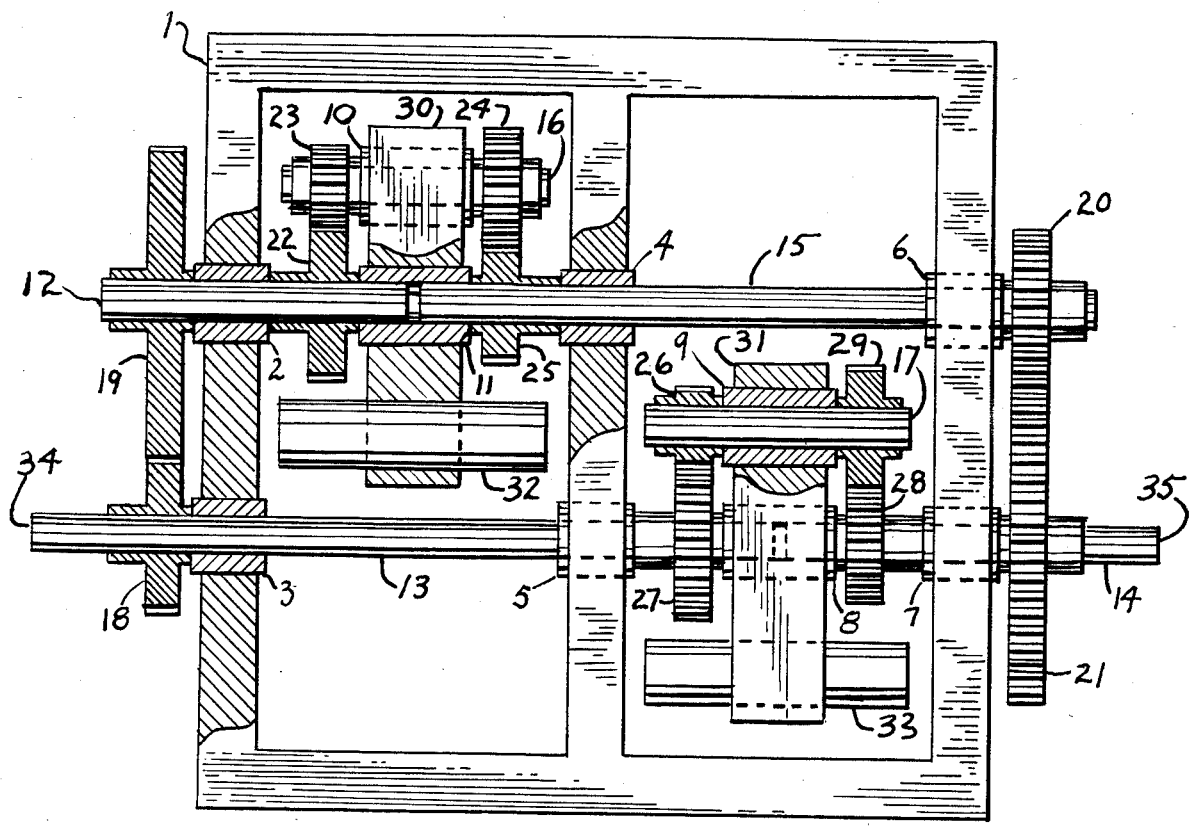

4,805,488

ADAPTIVE-RATIO TRANSMISSION

BACKGROUND OF THE INVENTION

1. Field of the Invention

My invention relates to mechanical-power transmissions which vary the ratio of their output-torque to their input-torque, and in particular, my invention relates to those examples of said transmissions which comprise gears, or equivalents thereof, and which vary the said ratio automatically.

2. Description of the Prior Art

The only fully successful automatic ratio-varying geared transmission is the automobile automatic transmission, introduced half a century ago, wherein a particular gear-ratio is selected, from among a plurality of different gear-ratios provided, to engage the power input to the transmission output by means of an automatic control system comprising sensors, actuators and clutches responsive to the varying automobile operating conditions. The said automobile automatic transmission is preferably coupled to the engine output with a hydraulic torque-converter for cushioning the shock of torque transition as gears are shifted. Many attempts have been made in the prior art to devise an automatic, self-adjusting stepless ratio-varying geared transmission without a control system, but none has proven successful.

SUMMARY OF THE INVENTION

The principal object of my invention is to provide an improved automatic, ratio-varying transmission comprising gears, or equivalents thereof, which does not involve any control system, thus aiding economy of manufacture and maintenance, and improving dependability in operation, as compared with automatic transmissions which do involve control systems. Another object of my invention is to provide an automatic ratio-varying geared transmission which produces a continuous, stepless, torque-ratio variation so as to provide smooth, pleasant operation without introducing any torque hiatus or shock from shifting gears, thus optimizing performance.

My invention comprises an automatically compliant, self-adjusting geared transmission mechanism, referred to hereinafter as a speed-adaptive coupling, that involves no controls of any kind and provides a range of smooth stepless variation in the ratio of its output-torque to its input-torque together with the inversely corresponding variation of its output to input rotary-speed ratio. The said speed-adaptive coupling comprises coaxial rotatably supported adjacent input and output shafts, each carrying a sun-gear fixedly mounted on its mutually proximate end. The sun-gears mesh, in an epicyclic gear-train, with corresponding planetary gears of an axially parallel planetary gear-spool rotatably mounted on a rotor which is itself freely rotatable about the axis of the sun-gears. The pitch-diameter relationship among said gears is designed so as to develop a torque in said rotor that balances the torque reaction of said rotor to the output-torque of said epicyclic gear-train while coincidentally providing the essential variability in the output to input rotary-speed ratio of said speed-adaptive coupling. Input-power of said speed-adaptive coupling automatically divides variably, responsive to the instant rotary-speed of said rotor, between said planetary ger-spool and the said rotor to be separately conditioned by their respective mechanical advantages so that when said divided and separately conditioned input-power is recombined at the output of said speed-adaptive coupling, the resulting output-torque matches the load-torque at the output, within the design range, and the resulting output rotary-speed absorbs the power available. The range of output of input torque and rotary-speed ratios provided by may invention may be increased by coupling a plurality of said speed-adaptive couplings together serially, or in parallel by proportioned gears at the inputs and outputs of said speed-adaptive couplings as in the preferred embodiment of my invention shown in the drawing.

The expression: "ratio of output-torque to input-torue" is replaced in this SPECIFICATION by "mechanical advantage" where brevity is desired.

A complete explanation of the operation of my invention is given later in this specification.

BRIEF DESCRIPTION OF THE DRAWING

The following drawing shows a simple version of the preferred embodiment of my invention as aligned in plan view.

Only elements relevant to defining my invention are shown; customary elements which are not particular to my invention, such as mounting means for the frame or fastening means between parts, are omitted from the drawing in order to avoid cluttering the drawing unnecessarily. For clarity and ease of comprehension of the drawing, some similar parts are shown in one case from the outside and in another case are shown as cut away to the plane of symmetry that is parallel to the plan view. In the drawing, the numeral 1 designates the supporting structure shown as a partially cutaway open frame; the numerals, 2, 3, 4, 5, 6, 7, 8, 9, 10 and 11 designate anti-friction bearings shown as cylindrical bushings; the numberals 12, 13, 14, 15, 16 and 17 designate cylindrical shafts; the numerals 18, 19, 20, 21, 22, 23, 24, 25, 26, 27, 28 and 29 designate gears which are shown edgewise as spur gears; the numerals 30 and 31 designate rotors shown as oblong bodies; the numerals 32 and 33 designate counterbalances shown as cylindrical weights fixedly mounted in rotors 30 and 31 respectively; the numeral 34 indicates the end of shaft 13 to which the given external source of rotary mechanical power should be coupled, and numeral 35 indicates the end of shaft 14 to which the given external power-absorbing rotary torque-load should be coupled.

Bushings 2, 4 and 6 are aligned coaxially and are fixedly mounted in frame 1. Bushings 3, 5 and 7 are aligned coaxially, parallel to bushings 2, 4 and 6, and are fixedly mounted in frame 1. Bushings 8 and 9 are fixedly mounted in rotor 31 with their axes parallel to each other and perpendicular to the plane of rotation of rotor 31. Bushings 10 and 11 are fixedly mounted in rotor 30 with their axes parallel to each other and perpendicular to the plane of rotation of rotor 30. Shaft 12 is rotatably held by bushings 2 and 11. Shaft 13 is rotatably held by bushings 3, 5 and 8. Shaft 14 is rotatably held by bushings 7 and 8. Shaft 15 is rotatably held by bushings 4, 6 and 11. Shaft 16 is rotatably held by bushing 10, and shaft 17 is rotatably held by bushing 9. Gear 18 is fixedly mounted on shaft 13 adjacent to shaft-end 34. Gear 19 meshes with gear 18 and is fixedly mounted on the outside end of shaft 12. Gear 20 is fixedly mounted on the outside end of shaft 15 and meshes with gear 21 which is fixedly mounted on shaft 14 adjacent to shaft-end 35.

Sun-gear 22 is fixedly mounted on shaft 12 between bushings 2 and 11, and meshes with planetary-gear 23 which is fixedly mounted on one end of shaft 16; planetary-gear 24 is fixedly mounted on the other end of shaft 16 of the planetary gear-spool 23, 16, 24, and meshes with sun-gear 25 which is fixedly mounted on shaft 15 between bushings 4 and 11. Planetary-gear 26 is fixedly mounted on one end of shaft 17 and meshes with sun-gear 27 which is fixedly mounted on shaft 13 between bushings 5 and 8. Sun-gear 28 is fixedly mounted on shaft 14 between bushings 7 and 8 and meshes with planetary-gear 29 which is fixedly mounted on shaft 17 at the end opposite from planetary-gear 26 of the planetary gear-spool 26, 17, 29. Rotor 30 is rotatably supported on the inner-end portions of shafts 12 and 15 that are within busing 11. Rotor 31 is rotatably supported on the inner-end portions of shafts 13 and 14 that are within bushing 8. The gears obviously are coaxial with the respective shafts on which said gears are mounted.

DESCRIPTION OF THE PREFERRED EMBODIMENT

Referring to the drawing, two separate parallel gear-trains are identifiable that cooperate to alter and transmit the input-torque and the input rotary-speed from shaft-end 34 to shaft-end 35 for delivery as the output-torque and as the output rotary-speed, respectively, at shaft-end 35. One gear-train comprises parts 34, 13, 18, 19, 12, 22, 23, 30, 16, 24, 25, 15, 20, 21, 14 and 35, and shall be referred to hereinafter as gear-train A. The other gear-train comprises parts 34, 13, 27, 26, 31, 17, 29, 28, 14 and 35, and shall be referred to hereinafter as gear-train B. It is obvious from the drawing that gear-train A and gear-train B can be made to have their respective ratios of output-torue to input-torque differ from each other as the result of design choice in the selection of the pitch-diameter ratios for their respectie meshing gear-pairs 19, 18 and 20, 21, coupling inputs 12, 13 and outputs 15, 14 respectively of said gear-trains A and B. In the drawing, gear-train A is shown as having a greater mechanical advantage than has gear-train B. The total input-torque supplied to shaft 13 at the input shaft-end 34 divides at gear 18, a portion of said torque being picked off shaft 13 by gear 18 and altered and transmitted by gear-train A to be summed on shaft 14, at the output shaft-end 35, with the remaining portion of said total input-torque that is altered and transmitted by gear-train B. The aforesaid portion of the total input-torque, picked off shaft 13 by gear 18, automatically attains the proportion that is sufficient, when multiplied by the mechanical advantage of gear-train A and summed with the remaining portion of the aforesaid total input-torque multiplied by the machanical advantage of gear-train B, to cause rotation of the output shaft-end 35, or in other words, to overcome the load-torque imposed on shaft-end 35, within the design range.

In the version of the preferred embodiment of my invention shown in the drawing, the rotary-speed of shaft 13 is identical with the input rotary-speed supplied at shaft-end 34. The rotary-speed of shaft 12 is in a direction opposite to that of shaft 13 and is fixedly related in magnitude to the rotary-speed of shaft 13 by the pitch-diameter ratio of the meshing gear-pair, 18 and 19. The rotary-speed of shaft 14 is identical with the output rotary-speed at shaft-end 35. The rotary-speed of shaft 15 is in a direction opposite to that of shaft 14, and is fixedly related in magnitude to the rotary-speed of shaft 14 by the pitch-diameter ratio of the meshing gear-pair, 20 and 21. Inasmuch as the ratio of the output-torque, at shaft-end 35, to the input-torque, at shaft-end 34, varies automatically as required in the operation of my invention, the ratio of the output rotary-speed, at shaft-end 35, to the input rotary-speed, at shaft-end 34, varies correspondingly, but inversely, to the said variation in the ratio of output-torque to input-torque. From the foregoing description of the rotary-speed of shafts 12, 13, 14 and 15 and of shaft-ends 34 and 35, it is obvious that the rotary-speed of shaft 15 can not have a fixed relationship with the rotary-speed of shaft 12, and the rotary-speed of shaft 14 can not have a fixed relationship with the rotary-speed of shaft 13. The variable relationship between the rotary-speed of shaft 15 and the rotary-speed of shaft 12 is made possible, as will be explained later, by the freedom of rotor 30 to rotate differentially, between the rotations of shafts 15 and 12, in the speed-adaptive coupling comprising parts 11, 30, 32, 22, 25, 10, 16, 23 and 24, which shall be referred to hereinafter as speed-adaptive coupling AC. Similarly, the variable relationship between the rotary-speed of shaft 14 and the rotary-speed of shaft 13 is made possible by the freedom of rotor 31 to rotate differentially, between the rotations of shafts 14 and 13, in the speed-adaptive coupling comprising parts 8, 31, 33, 27, 28, 9, 17, 26 and 29, which shall be referred to hereinafter as speed-adaptive coupling BC. Speed-adaptive coupling AC alters and transmits torque from shaft 12 to shaft 15 by means of the epicyclic meshing gear-pairs, 22, 23 and 24, 25, and by means of the rotor 30 as will be explained later. Similarly, speed-adaptive coupling BC alters and transmit torque from shaft 13 to shaft 14 by means of the epicyclic meshing gear-pairs, 27, 26 and 29, 28, and by means of rotor 31. However, for any torque to traverse to shaft 15 from shaft 12, a balancing torque must be provided to rotor 30 to counteract the torque reaction on rotor 30 to the torque transmitted to shaft 15 by the gear-spool 23, 16, 24 of the speed-adaptive coupling AC. If said balancing torque not be provided, rotor 30 will merely spin in response to any rotation of shaft 12 and the speed-adaptive coupling AC will not transmit power. In my invention, the aforesaid necessary torque is provided by selection of the pitch-diameters of gears, 22, 23, 24 and 25 of the speed-adaptive coupling AC so as to have a certain relationship among themselves as will be defined later in this specification. Similarly, a balancing torque must be provided to rotor 31 to counteract the torque reaction on rotor 31 to the torque transmitted to shaft 14 by the gear-spool 26, 17, 29 of the speed-adaptive coupling BC, and the said balancing torque for rotor 31 is provided by selection of the pitch-diameters of gears 26, 27, 28 and 29, of the speed-adaptive coupling BC, so as to have a certain relationship among themselves similar to the certain relationship among gears 22, 23, 24 and 25 of the speed-adaptive coupling AC. Speed-adaptive coupling AC transmits power from its input shaft 12 to its output shaft 15 by two complementary pathways, which are: the rotary-speed of the planetary gear-spool 23, 16, 24, as modulated by the rotary-speed of its associated rotor 30, and the rotary-speed of the rotor 30 itself. The said rotary-speed of rotor 30 varies automatically so as to provide for compliance between the incommensurably varying rotary-speeds of the input shaft 12 and the output shaft 15 of the speed-adaptive coupling AC as is explained later. Similarly to speed-adaptive coupling AC, speed-adaptive coupling BC transmits power from its input shaft 13 to its output shaft 14 by two complementary pathways, which are: the rotary-speed of the planetary gear-spool 26, 17, 29, as modulated by the rotary-speed of its associated rotor 31, and the rotary-speed of rotor 31 itself. The said rotary-speed of rotor 31 varies automatically so as to provide for compliance between the incommensurably varying rotary-speeds of the input shaft 13 and the output shaft 14 of the speed-adaptive coupling BC.

EXPLANATION OF OPERATION

The foregoing DESCRIPTION OF THE PREFERRED EMBODIMENT is amplified in the following explanation of operation. List of symbols employed:

r = gear pitch-diameter/2
Q = torque or moment
n = rotary-speed
P = power = $2\pi Qn$
x = variable unknown fraction between zero and one Subscript numerals refer to correspondingly numbered parts in the drawing.

THE SPEED-ADAPTIVE COUPLING

The speed-adaptive coupling is the core of my invention and provides either an unrestricted range of variation in its ratio of output to input rotary-speed or a limited range of variation in the ratio of its output to input torque. The speed-adaptive coupling, therefore, is an ADAPTIVE-RATIO TRANSMISSION embodiment of limited range of variation of torque ratio as well as a transmission means of unrestricted variability in rotary-speed ratio as required by THE PREFERRED EMBODIMENT to function.

The epicyclic-gears' proportional relationship: Referring to speed-adaptive coupling AC in the drawing, the proportions of the epicyclic gears 22, 23, 24, 25 are designed to produce the same static torque about output-shaft 15 in the otherwise freely rotatable rotor 30 as from gear-spool 23, 16, 24, thus insuring said rotor 30 be in torque balance with said gear-spool just as if freely rotatable rotor 30 were a fixed structural element of frame 1. To amplify: taking the moments on rotor 30 about shaft 15 that constitute the rotor torque $Q_{30}$ and setting $Q_{30}$ equal to the torque produced by planetary gear-spool 23, 16, 24 about shaft 15 determines the proportional relationship among the epicyclic gears 22, 23, 24, 25 as follows:

$$Q_{30} = r_{22}Q/r_{22} + r_{25}Q_{24}/r_{24} = Q_{25}$$

But from the gear-ratios of the epicyclic gear-train 22, 23, 24, 25:

$$r_{25}Q_{24}/r_{24} = -Q_{25}$$

and $$Q_{25} = Q_{22}(r_{23}r_{25}/r_{22}r_{24}).$$

Therefore, $$Q_{22} = 2Q_{25}$$

and $$r_{22}r_{24}/r_{23}r_{25} = 2.0$$

which is the proportional relationship among epicyclic gears 22, 23, 24, 25 that provides torque balance to the freely rotatable rotor 30 that is required for my invention to function.

VARIABLE ROTARY-SPEED RATIO

Rotary-speed of rotor 30 affects the rotary-speed of planetary gear-spool 23, 16, 24, derived from the rotary-speed of the input sun-gear 22, and hence affects the output rotary-speed of sun-gear 25. For example, if the freely rotatable rotor 30 is rotating at the same rotary-speed as input sun-gear 22, there is no relative rotary-speed between the gear-spool and input sun-gear 22. Hence the speed-adaptive coupling is rotating, in this case, as if it were a rigid unit, and the ratio of output to input rotary-speed is:

$$n_{25}/n_{22} = 1.0$$

(when $n_{30} = n_{22}$)

However, when rotor is not rotating at all, the output rotary-speed is related to the input rotary-speed by the gear-ratios of the epicyclic gear-train 22, 23, 24, 25 as follows:

$$n_{25}/n_{22} = r_{22}r_{24}/r_{23}r_{25} = 2.0$$

(when $n_{30} = 0$)

since the relationship $r_{22}r_{24}/r_{23}r_{25}$ was determined hereinbefore to be equal to 2.0 to provide the torque balance to rotor 30 that is necessary in my invention. Thus the output to input rotary-speed ratio is obviously a variable. The output to input rotary-speed ratio $n_{25}/n_{22}$ variation is fully defined as follows for the epicyclic gear-train 22, 23, 24, 25 and freely rotatable rotor 30:

$$n_{23} = -(n_{22} - n_{30})(r_{22}/r_{23}) + n_{30} = n_{24}$$

but also;

$$n_{24} = -(n_{25} - n_{30})(r_{25}/r_{24}) + n_{30}.$$

Setting the two above equations for $n_{24}$ equal to each other and substituting 2.0 for $r_{22}r_{24}/r_{23}r_{25}$, as determined hereinbefore, gives the following variable relationship between the input and output rotary-speeds of the speed-adaptive coupling as made possible by the freedom to rotate of rotor 30:

$$n_{25} = 2n_{22} - n_{30}$$

From the immediately above equation it can be seen that if the output sun-gear be stopped from rotating, the rotary-speed of the rotor 30 would become twice that of the input sun-gear 22. The output power then would be zero, however, and reduce the power demand from the input to be zero also, corresponding to an idling power sufficient only to overcome the friction. Also it can be seen from the above derivation of the output to input rotary-speed relationship of the speed-adaptive coupling that if the sun-gears 22 and 25 were made of equal diameter, the planetary gears thereby being also of equal diameter, the hereinabove derived rotary-speed relationship would be reduced instead to:

$$n_{25} = n_{22} - n_{30}(0)$$

which means that the output rotary-speed $n_{25}$ would equal the input rotary-speed for any rotary-speed of the rotor 30. To illustrate, if the supposed sun-gears having equal diameters are not rotating, the associated planetary gear-spool can roll freely around said sun-gears carrying along the unresisting associated rotor. If the supposed input sun-gear is rotated, the associated meshing planetary gear-spool will drive the output sun-gear to be locked in synchronism with the input sun-gear, whatever the state of rotor rotation might be. Since it has been shown hereinbefore that the relationship among the epicyclic gear-diameters, $r_{22}$, $r_{23}$, $r_{24}$, $r_{25}$, of the speed-adaptive coupling AC must to provide rotor balance in my invention, variability of the output to input rotary-speed ratio of said speed-adaptive coupling is provided coincidentally also, since $r_{22}$ and $r_{25}$ must not be equal.

POWER AND TORQUE TRANSMISSION

Power input $P_{12}$ to speed-adaptive coupling AC from input-shaft 12 divides variably between rotating the planetary gear-spool 23, 16, 24 and rotating the rotor 30. The divided powers recombine at the output to rotate output-shaft 15. The freely rotatable balanced rotor 30, however, transmits no power when not rotating, in which case the rotating gear-spool 23, 16, 24 transmits all of the power available by way of the mechanical advantage of the epicyclic gear-train which is: $r_{23}r_{25}/r_{22}r_{24} = \frac{1}{2}$, from the determination hereinbefore of the proportional relationship among the epicyclic gears 22, 23, 244, 25 required for rotor torque-balance. When rotor 30 is rotating at the same speed as the input-shaft 12, the speed-adaptive coupling AC is rotating as would a rigid unit so that the output-torque $Q_{15}$ is equal to the input-torque $Q_{12}$, corresponding to a mechanical advantage of 1.0. The mechanical advantage of said speed-adaptive coupling cannot exceed 1.0 since the torque contribution of rotor 30 to output-shaft 15 cannot exceed torque $Q_{30}$ developed in said rotor to be equal to, and thus provide torque-balance with, the torque $Q_{25}$ developed by planetary gear-spool 22, 16, 24 about output-shaft 15, and said $Q_{25}$ equals $Q_{22}/2$ of input.

THE PREFERRED EMBODIMENT

The speed-adaptive coupling is an embodiment of my invention that provides a limited stepless range of mechanical advantage. Cascading a plurality of speed-adaptive couplings represents an embodiment providing correspondingly increased stepless ranges of mechanical advantage. THE PREFERRED EMBODIMENT of my invention shown in the drawing is adaptable to providing a range of optionally increased stepless ranges of mechanical advantage by design choice of the proportions of the gears 19, 18 and 20, 21 connecting the inputs 12, 13 and outputs 15, 14 respectively of speed-adaptive couplings AC and BC, respectively, arranged in parallel. Referring to the drawing, the hereinbefore DESCRIPTION OF THE PREFERRED EMBODIMENT is amplified by the following: $Q_{35}n_{35} = Q_{34}n_{34}$ from the Law of Conservation of Energy, and where $Q_{35}$, $Q_{34}$ and $n_{34}$ are determined from the particular conditions of operation. The unknown $n_{35} = n_{34}q_{34}/Q_{35}$. The input-torque, $Q_{34}$, divides variably between gear-train A and gear-train B to be altered separately by their respective mechanical advantages and recombined at shaft 14 to provide the specified output-torque $Q_{35}$ as follows:

$$Q_{35} = xQ_{34})r_{19}/r_{18})(Q_{25}/Q_{22})(r_{21}/r_{20}) + (1-x)Q_{34}(-Q_{28}/Q_{27})$$

where $r_{19}/r_{18}$ and $r_{21}/r_{20}$ are selected by design, and the mechanical advantages of the speed-adaptive couplings AC and BC, $Q_{25}/Q_{22}$ and $Q_{38}/Q_{27}$ respectively, tend to the limit value of 1.0 since rotors 30 and 31 will be usually in rotation. As the proportioning variable x seeks its solution between 0 and 1.0, the mechanical advantage of the said PREFERRED EMBODIMENT will fall between the corresponding mechanical advantages of gear-train B and gear-train A respectively, that is, between $Q_{28}/Q_{27}$ and $(r_{19}r_{21}/r_{18}r_{20})Q_{25}/Q_{22}$ respectively.

The foregoing specification is referred to the simple version of the preferred embodiment of my invention comprising speed-adaptive couplings, as shown in the drawing, but my invention is not limited to the said simple version of my invention. My invention is susceptible to unlimited variation in design by those skilled in the art without departing from the bounds of my invention. For example, the drawing shows a single planetary gear-spool in the rotor of each speed-adaptive coupling accompanied by a balancing weight: replacing the said balancing weight by another planetary gear-spool, or by a number of circularly disposed planetary gear-spools, would not constitute an improvement on my invention but would constitute merely a variation in design. Likewise, substituting equivalent means for conveying rotational energy, such as frictionally engaged wheels, sprockets and chains or pulleys and belts, for the gears employed in my invention would not constitute an improvement on my invention but would constitute merely a variation in design. Also, although the drawing shows two parallel gear-trains geared proportionately together for connecting the power-input shaft with the power-output shaft of my invention, conceivably more than two parallel gear-trains may be employed in my invention but would not constitute thereby an improvement on my invention but would constitute merely a variation in design.

Furthermore, although the drawing shows two parallel gear-trains, each comprising a speed-adaptive coupling, with proportioned meshing gears rotatably connecting their respective input-shafts and output-shafts to constitute an adaptive-ratio transmission capable of providing greater stepless variation in mechanical advantage than a single speed-adaptive coupling along provides, combining a plurality of speed-adaptive couplings serially, with their shafts connected output to input, would constitute also an adaptive-ratio transmission capable of providing greater stepless variation in mechanical advantage than a single speed-adaptive coupling provides, but would not constitute thereby an improvement on my invention but would constitute instead a variation in embodiment.

My invention may be adapted for use in combination with other devices, such as clutches, speed-reducing gears, reverse gear controls, differential gears or such like, without said such combination constituting an improvement on my invention but constituting merely an application of my invention.

Having thus described my invention, what I claim as my invention is:

1. An automatically self-adjusting gear mechanism providing a limited range of continuously variable mechanical advantage or an unrestricted range of continuously variable output to input rotary-speed ratio, said mechanism comprising: an input shaft rotatably supported coaxial with a rotatably supported output shaft, an epicyclic gear train, said epicyclic gear train comprising a first sun gear fixed to the input shaft, a second sun gear fixed to the output shaft, a rotor rotatably mounted coaxial with the shafts and rotatably supporting a planetary gear spool, the gear spool being parallel to the shafts and supporting first and second unequal planetary gears fixed at opposite ends thereof, said first and second planetary gears mesh with first and second sun gears, respectively; and pitch diameters of each one of said sun gears and planetary gears are proportioned individually with respect to each other so as to produce torque static balance between said rotor and epicyclic gear train.

2. An automatically self-adjusting gear mechanism providing a limited range of continuously variable mechanical advantage or an unrestricted range of continuously variable output to input rotary-speed ratio, said mechanism comprising: an input shaft rotatably supported coaxial with a rotatably supported output shaft, an epicyclic gear train, said epicyclic gear train comprising a first sungear fixed to the input shaft, a second sun gear fixed to the output shaft, a rotor rotatably mounted coaxial with the shafts and rotatably supporting a planetary gear spool, the gear spool being parallel to the shafts and supporting first and second planetary gears fixed at opposite ends thereof, said first and second planetary gears mesh with first and second sun gears, respectively; the pitch diameter of the first sun gear multiplied by the pitch diameter of the second planetary gear and divided by the pitch diameter of the first planetary gear and divided by the pitch diameter of the second sun gear being equal to 2.0.

3. An automatically self-adjusting gear mechanism providing a range of continuously variable mechanical advantage, said mechansim comprising: an input shaft rotatably supported coaxial with a rotatably supported output shaft, a first epicyclic gear train, said epicyclic gear train comprising a first sun gear fixed to the input shaft, a second sun gear fixed to the output shaft, a first rotor rotatably mounted coaxial with the shafts and rotatably supporting a first planetary gear spool, the first gear spool being parallel to the shafts and supporting first and second planetary gears fixed at opposite ends thereof, said first and second planetary gears mesh with the first and second sun gears, respectively, the pitch diameter of the first sun gear multiplied by the pitch diameter of the second planetary gear and divided by the pitch diameter of the first planetary gear and divided by the pitch diameter of the second sun gear equal to 2.0; a second epicyclic gear train arranged parallel to said first epicyclic gear train and comprising: a third sun gear fixed to a shaft rotatably connected to the input shaft, a fourth sun gear fixed to a shaft rotatably connected to the output shaft, a second rotor supporting a second planetary gear spool, said second gear spool supporting third and fourth planetary gears at opposite ends thereof, said third and fourth planetary gears mesh respectively with said third and fourth sun gears, the pitch diameter of the third sun gear multiplied by the pitch diameter of the fourth planetary gear and divided by the pitch diameter of the third planetary gear and divided by the pitch diameter of the fourth sun gear being equal to 2.0.

* * * * *